US00H002224H

(19) United States
(12) Statutory Invention Registration
Madden

(10) Reg. No.: US H2224 H
(43) Published: Oct. 7, 2008

(54) SELF-CALIBRATING LARGE BASELINE INTERFEROMETER FORMED FROM TWO AIRCRAFT

(75) Inventor: Thomas L. Madden, Dayton, OH (US)

(73) Assignee: The United States of America as represented by the Secretary of the Air Force, Washington, DC (US)

(21) Appl. No.: 11/251,003

(22) Filed: Oct. 14, 2005

(51) Int. Cl.
*G01S 5/02* (2006.01)

(52) U.S. Cl. ..... 342/424; 342/442; 342/444

(58) Field of Classification Search ..... 342/424, 342/442, 444
See application file for complete search history.

(56) References Cited

U.S. PATENT DOCUMENTS 5,914,687 A * 6/1999 Rose ..... 342/442
5,999,129 A * 12/1999 Rose ..... 342/394
6,255,992 B1 * 7/2001 Madden ..... 342/424
6,407,703 B1 * 6/2002 Minter et al. ..... 342/450
6,577,272 B1 * 6/2003 Madden ..... 342/387

* cited by examiner

*Primary Examiner*—Dan Pihulic
(74) *Attorney, Agent, or Firm*—Gina S. Tollefson; AFMCLO/JAZ

(57) ABSTRACT

A method to passively locate an emitter using two aircraft to form a large baseline interferometer. The basic two element (two aircraft or helicopters) large baseline interferometer includes self-calibration and allows for various configurations for geo-location of ground-based emitters. The two aircraft large baseline interferometer can measure phase difference of arrival (PDOA) to very precisely locate the emitter in angle. Moving emitters can also be located and tracked using the method of the invention with greater accuracy than can be achieved from a single platform.

15 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SELF-CALIBRATING LARGE BASELINE INTERFEROMETER FORMED FROM TWO AIRCRAFT

RIGHTS OF THE GOVERNMENT

The invention described herein may be manufactured and used by or for the Government of the United States for all governmental purposes without the payment of any royalty.

CROSS-REFERENCE TO RELATED PATENTS

The present document is somewhat related to my issued U.S. Patents "SELF-CALIBRATING LARGE BASELINE INTERFEROMETER FOR VERY PRECISE EMITTER LOCATION USING TIME DIFFERENCE OF ARRIVAL" and "TIME DIFFERENCE OF ARRIVAL RATE", U.S. Pat. No. 6,255,992, issued Jul. 3, 2001; and "MOVING EMITTER PASSIVE LOCATION FROM MOVING PLATFORM", U.S. Pat. No. 6,577,272, issued Jun. 10, 2003, and both commonly assigned to The United States of America as represented by the Secretary of the Air Force. The contents of these, my somewhat related issued patents, are hereby incorporated by reference.

BACKGROUND OF THE INVENTION

This invention relates to the field of remote energy-emitting source location through passive received signal processing.

Although radio locating has been used since the early days of radio, current military apparatus with its limited output signal durations and the availability of computerized signal processing, faster analog to digital conversion apparatus and a need to accomplish rapid, accurate signal locations from a moving vehicle provide opportunity for improvement in this art.

Current state of the art for passive geo-location of a ground based emitter using two aircraft requires each aircraft to independently measure time of arrival (TOA) of the radio frequency (RF) signal, exchange the information, so that one or both can then calculate time difference of arrival (TDOA). This will require atomic clocks on both aircraft, or some other method of determining the precise time at each aircraft. The accuracy of this open loop approach is also limited by the sample times of a sampling clock and the linearity of the pulse leading edge. The open loop method is also limited by the differences in the path lengths from the antenna to the measurement receiver. A more precise method of determining TDOA is a differential approach where TDOA is obtained by iteratively adjusting an analog variable delay line until the two signals cancel. This cancellation is very precise because it not only cancels the pulse envelope but also the RF carrier by phase alignment. The method of TDOA measurement by differential delay adjustment requires both RF signals to be available at the two channel measurement receiver and that both channels operate with a common LO and common sampling clock. This method also includes an approach to calibrate the two receive paths of the interferometer.

The present invention improves the precision of currently available methods by using two aircraft to form a large baseline interferometer. This avoids problems associated with using a single aircraft with one or more tethered antennas. The present invention allows for various configurations for geo-location of ground-based emitters from moving aircraft and tracking both stationary and moving emitters.

SUMMARY OF THE INVENTION

A method to passively locate a ground-based emitter using two aircraft to form a large baseline interferometer.

The basic two element (two aircraft or helicopters) large baseline interferometer includes self-calibration and allows for various configurations for geo-location of ground-based emitters. The two aircraft large baseline interferometer measurement capability includes phase difference of arrival (PDOA) to very precisely locate the emitter in angle. Moving emitters can also be located and tracked with the method of the invention using multiple aircraft.

It is an object of the present invention, therefore, to provide rapid, accurate location of a stationary ground emitter, such as a radar transmitter, from a double moving platform.

It is another object of the invention to provide a radio frequency source locating arrangement which is self-calibrating notwithstanding the presence of environmental-sourced and other inaccuracy influences.

It is another object of the invention to provide a time based moving platform locating system providing angle and range information relative to a distant moving target through use of received radio frequency signals.

It is another object of the invention to provide a stationary emitter locating system that is based on the differing arrival times of a radio frequency signals at two moving aircraft receivers using an iteratively adjusting variable delay line which cancels out two radio frequency signals.

It is another object of the invention to provide a moving or stationary emitter location system based on the use of large baseline signal interferometers.

It is another object of the invention to provide for the location of a moving emitter, such as an airborne radar, using multiple interferometers each formed from two aircraft.

These and other objects of the invention are achieved by the description, claims and accompanying drawings and by a multiple configuration, self-calibrating baseline interferometer radio frequency emitter locating apparatus using two aircraft comprising the combination of:

- a first search aircraft containing a first radio frequency measurement receiver, a first radio frequency antenna and a first variable delay component;
- a second aircraft containing a second radio frequency measurement receiver, a second radio frequency antenna and a second variable delay component;
- time difference of arrival, phase difference of arrival and phase difference of arrival rate processing apparatus disposed in each of said first and second radio frequency measurement receivers of said first and second aircraft;
- selectively operable signal propagation time delay calibration apparatus connectable with signal propagating paths interconnecting said first and second aircraft;
- and each of said signals entering each measurement receiver on said first and second aircraft whereby time difference of arrival, phase difference of arrival, phase difference of arrival rate are calculated by said processing apparatus and radio frequency emitter location is determined.

DETAILED DESCRIPTION

Traditionally interferometers operate by way of measuring signal phase characteristics. In large baseline interferometers, however, phase measurement provides ambiguous results because of the cyclic or periodic nature of the signal phase data. Time difference of arrival measurements are, however, not of this ambiguous nature since they are not cyclic or periodic in character. The time difference of arrival measurement arrangement is therefore the theoretical basis for the present invention as is disclosed in the paragraphs following.

Traditionally large baseline interferometers (LBI) are located on one aircraft. This limits the LBI length to the physical size of the aircraft. Examples are the side of the aircraft, the wing tips of the aircraft, or the nose to wing tip of the aircraft. U.S. Pat. No. 6,255,992 taught how to extend the LBI by using a tethered antenna and also taught how to calibrate the LBI to improve accuracy. (This calibration scheme can also be applied to a LBI installed on a single aircraft.) In U.S. Pat. No. 6,225,992 the geo-location accuracy is improved due to both the self-calibration scheme and the increased LBI length due to the ability to use a tethered antenna. This invention teaches how to form a phase interferometer from two separate aircraft.

Figure 1:
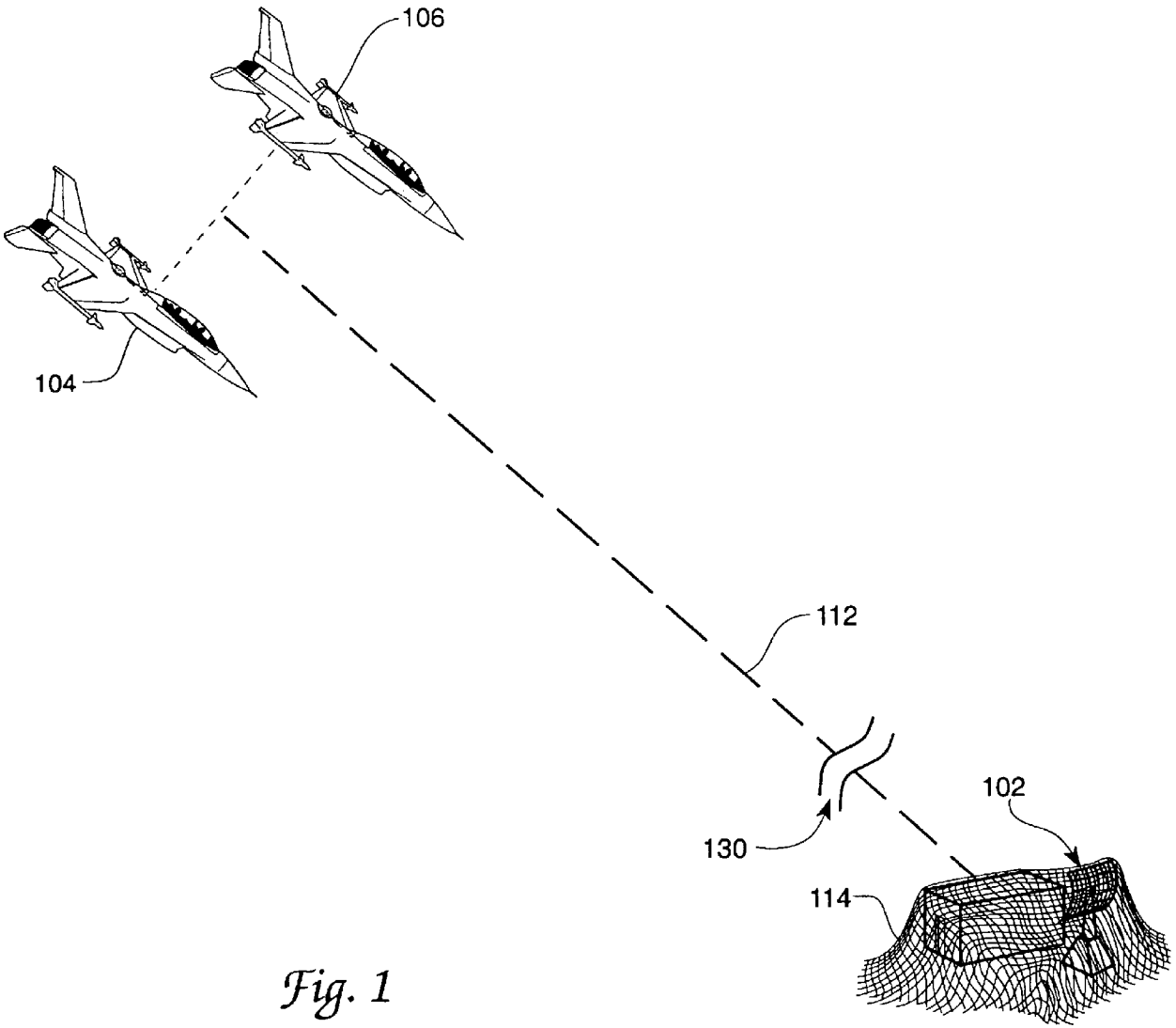
FIG. 1 shows the use of two aircraft to geo-locate a stationary ground-based emitter according to the present invention.

FIG. 1 in the drawings shows a preferred arrangement of the invention for geo-locating a ground-base emitter 102 by aircraft 104 and 106. Phase difference of arrival (PDOA) from the two aircraft interferometer locates the line of bearing 112 to the emitter very precisely but this measurement is ambiguous. Time difference of arrival (TDOA) is then used to resolve the ambiguities. The two aircraft determine the azimuth angle to the emitter. The elevation angle is determined by the aircraft altitude and the fact that the emitter is located on the ground.

Figure 2:
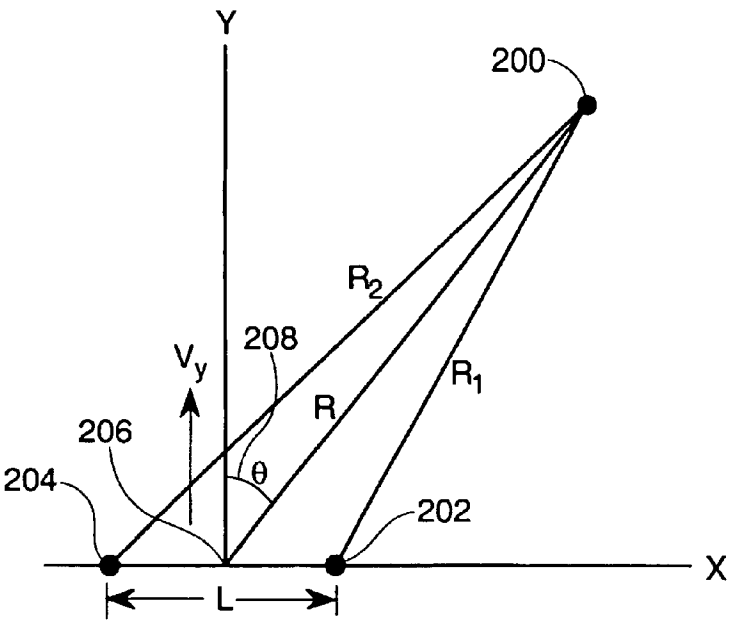
FIG. 2 shows geometric relationships applicable to radio frequency signals in a preferred arrangement of the present invention.

FIG. 2 shows geometric relationships applicable to radio frequency signals in a preferred arrangement of the present invention. The two LBI antenna are 202 and 204. The points 202 and 204 represent the two aircraft of FIG. 1. The stationary emitter is located at 200. The emitter is located relative to 206 the center of the LBI. The bearing 208 and range R of the emitter relative to the LBI center 206 can be determined by equations 10 and 11 of U.S. Pat. No. 6,225,992.

Figure 3:
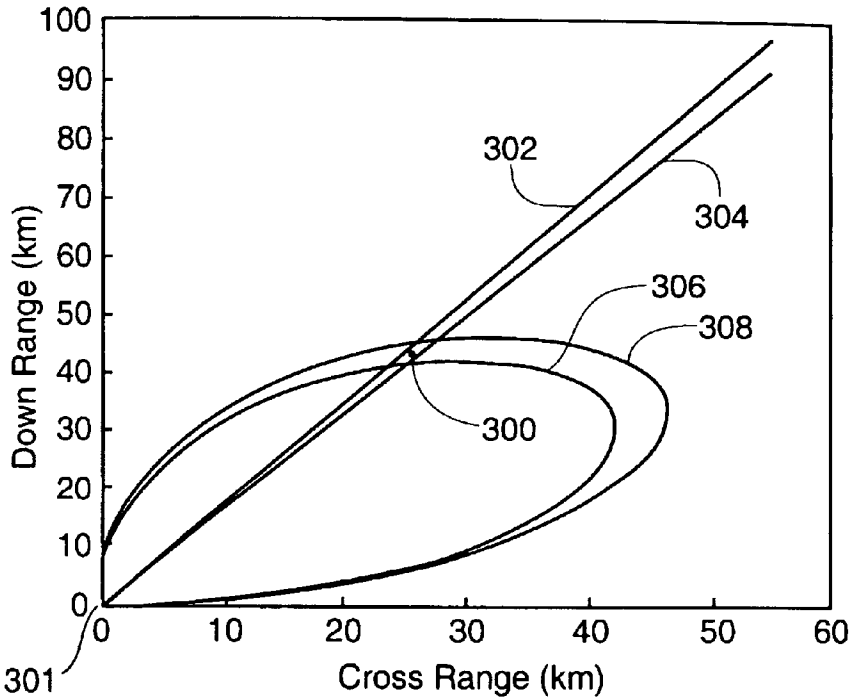
FIG. 3 shows a family of time and angle error curves relating to the FIG. 4 geometric relationships and their attending mathematical relationships.

FIG. 3 shows the results of applying equations 10 and 11 of U.S. Pat. No. 6,255,992. In the Cross Range Down Range diagram the emitter is located at 300. An exact measurement of TDOA would result in a line of bearing from the origin 301 to the emitter 300. Lines of bearing 302 and 304 represent the results of TDOA measurements with negative and positive error respectively. Likewise the error contours 306 and 308 represent measurement of TDOA rate with positive and negative errors respectively. The region bound by the four contours 302, 304, 306, 308 then bound the location of the emitter.

Figure 4:
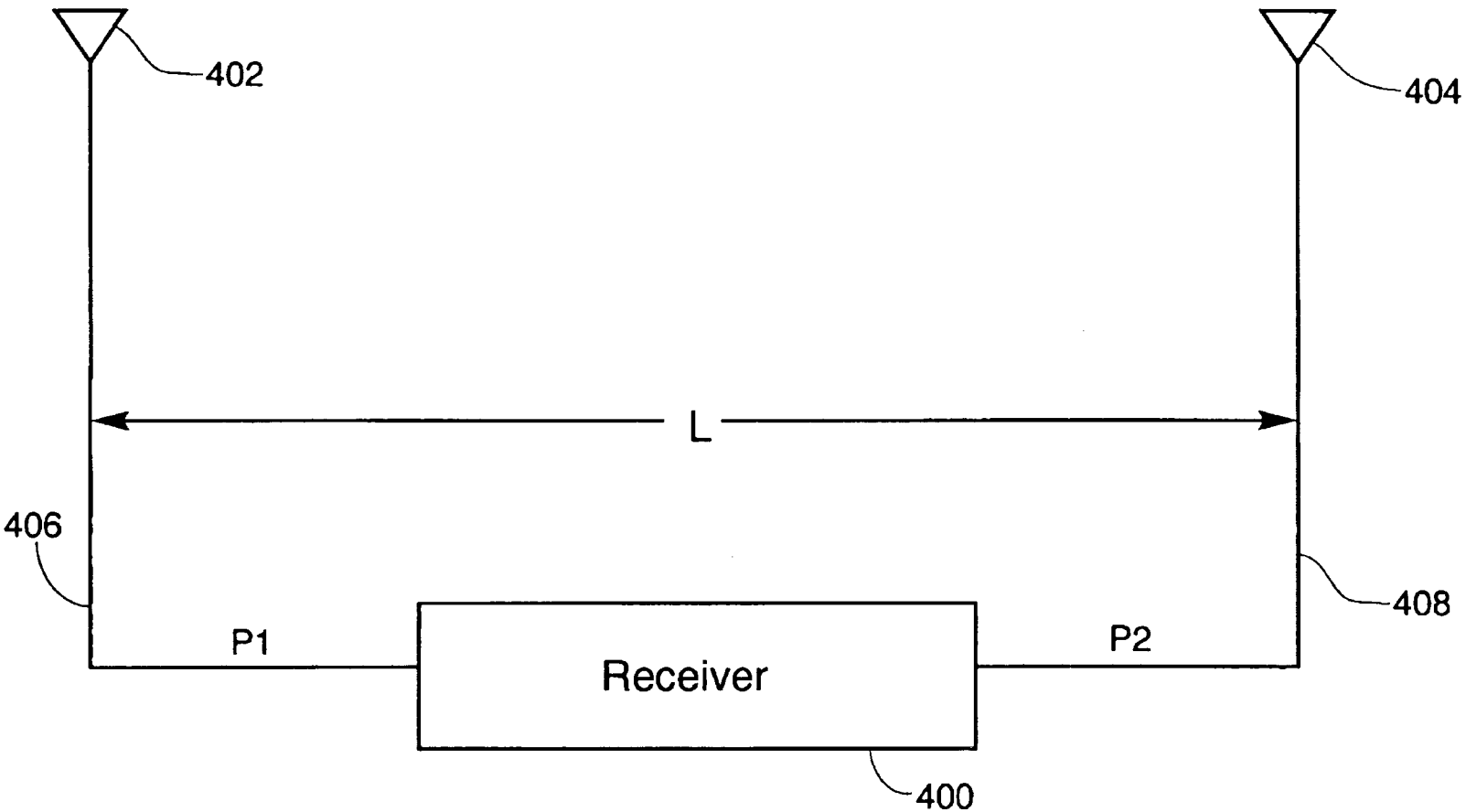
FIG. 4 shows the basic parts of a large baseline interferometer according to the invention.

FIG. 4 of the drawings shows the basic parts of a LBI. The purpose of the LBI is to locate the emitter relative to the antennas 402 and 404. This is accomplished by measuring PDOA, TDOA, and PDOA rate. (PDOA rate is also frequency difference of arrival (FDOA)). Primarily what is needed is PDOA and TDOA at the antennas. However the measurement is made at the receiver 400 not at the antennas. To determine the values at the antennas the paths P1 406 and P2 408 must be known. If the LBI is installed on a single aircraft then P1 and P2 can be measured before they are installed on the aircraft. However because of differential heating as the aircraft flies the paths may change. The self-calibration scheme of U.S. Pat. No. 6,255,992 can be used to calibrate for these changes. In the invention the two antennas are located on separate aircraft. As the aircraft fly both L and the paths too the receiver changes. Therefore self-calibration is essential for accurate operation.

Figure 5:
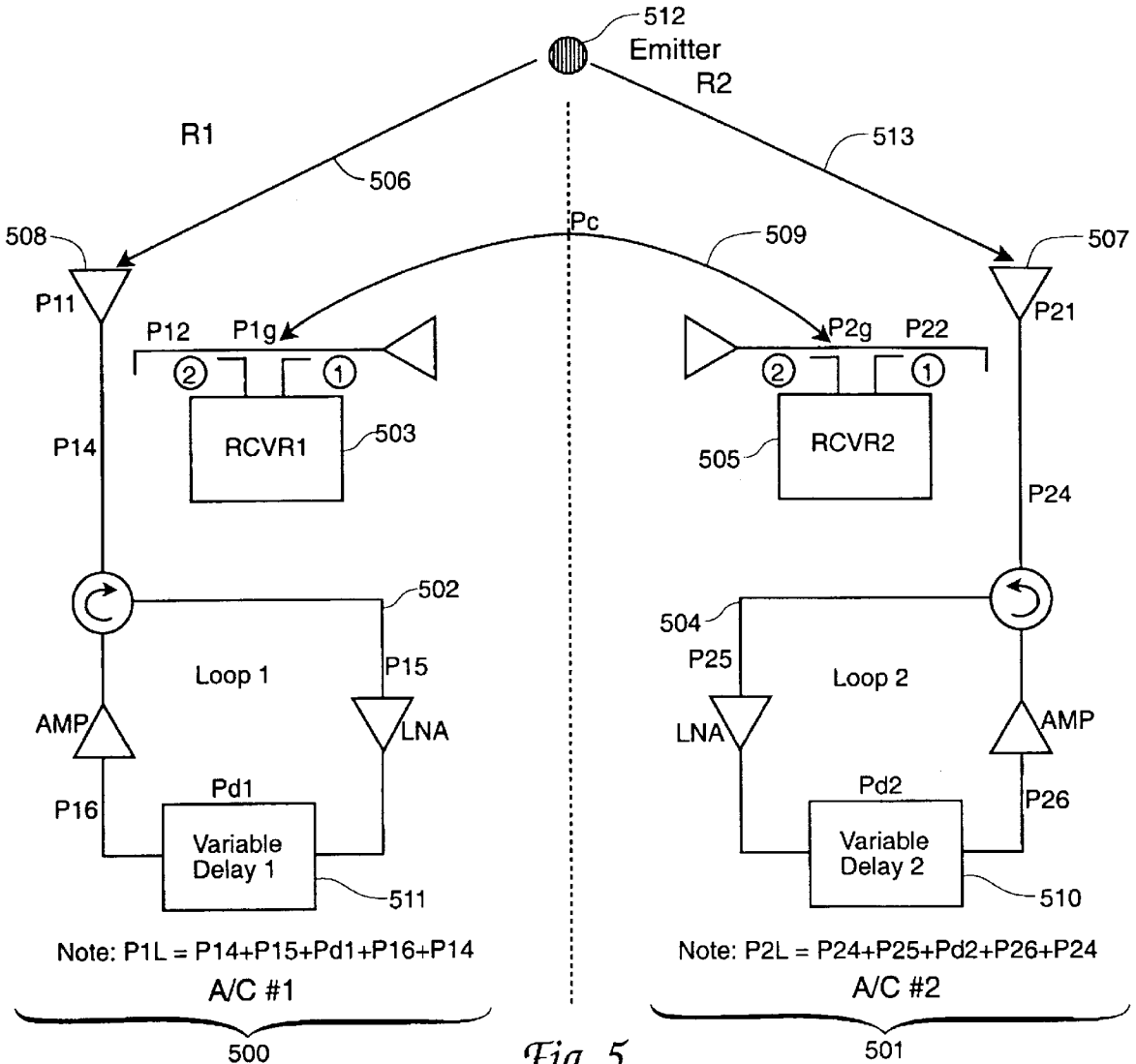
FIG. 5 shows a digital measurement receiver used in a preferred arrangement of the invention.

In the present invention, self-calibration is achieved primarily by sending the signal received at each aircraft through the same paths. Therefore, the paths are not measured as such by calibration but are instead common to both signals. FIG. 5 shows a digital measurement receiver used in a preferred arrangement of the invention. The purpose of the FIG. 5 diagram is to measure the TDOA, PDOA and PDOA rate of the emitter. The TDOA is given by equation (1):

$$TDOA=(R1=R2/c \qquad \text{Eq 1}$$

where c is the velocity of light.

The PDOA is given by:

$$PDOA=(2\pi/\lambda)*(R1-R2) \qquad \text{Eq 2}$$

where λis the wavelength.

$$PDOA\ rate=[PDOA(t2)-PDOA(t1)]/(t2-t1) \qquad \text{Eq 3}$$

The invention depicted in FIG. 5 consists of two similar circuits on each aircraft. Aircraft 1 is illustrated at 500 and aircraft 2 is illustrated at 501. The two main parts are the loop, 502 for aircraft 1 and 504 for aircraft 2 and the measurement receiver, illustrated at 503 for aircraft 1 and 505 for aircraft 2. Each loop contains a variable delay component, illustrated at 511 and 510. This could be a digital RF memory. An alternative would be a multiple port switch to switch between fixed delays such as multiple lengths of fiber optic lines. FIG. 5 is not to scale. The emitter is far from both aircraft so that paths R1 at 506 and R2 at 513 are approximately parallel.

The basic operation of the two aircraft interferometer is illustrated in FIG. 5 where signal R1 enters antenna 1 illustrated at 508 travels through loop1 at 502 then crosses over 509 to aircraft 2 and through loop2 at 504. Signal R1 then travels into measurement receiver 2 (MR2), 505, at input port 1 and back to aircraft 1 and into measurement receiver 1 (MR1), 503, at input port 1. Likewise signal R2 enters antenna 2 at 507 and travels through loop2 at 504 then crosses over to aircraft 1 and through loop1 at 502. Signal R2 then travels into MR1 at 503 at input port 2 and back to aircraft 2 and into MR2 at 505 at input port 2. Thus both signals enter each measurement receiver on each aircraft. The two signals R1 and R2 are prevented from overlapping in the amplifiers by timing. That is, the signal arriving from antenna 2 at 507 in loop 2 at 504 is held until after the signal arriving from antenna 1 is also stored in variable delay 2 at 510. Then the signal from antenna 2 is transferred to variable delay 1 at 511. Both signals enter each measurement receiver on each aircraft where TDOA, PDOA, and PDOA rate are measured. However, the values at each antenna are required not the values at the measurement receivers. That is, the paths from antenna 1 and antenna 2 to MR1 and MR2 are needed. However, since all the measurements are differential measurements the path absolute lengths are not required—only the difference between the two path lengths.

The following equations show how the required values are determined. There are four equations. Each equation starts at the emitter 512 in FIG. 5 and ends at the input to the measurement receiver. The equation sums up each path from the emitter to the input to the measurement receiver.

Path 1 is the path from the emitter through antenna 1 to the input of MR1.

$$R1+P11+P1L+P12+P1g+Pc+P2g+P22+P2L+P22+P2g+Pc=T11m \quad \text{Eq 4}$$

T11m is the measured arrival time of the signal through antenna 1 to MR1

Path 2 is the path from the emitter through antenna 2 to the input of MR1

$$R2+P21+P2L+P22+P2g+Pc+P1g+P12+P1L+P12=T12m \quad \text{Eq 5}$$

T12m is the measured arrival time of the signal through antenna 2 MR1

Path 3 is the path from the emitter through antenna 1 to the input of MR2

$$R1+P11+P1L+P12+P1g+Pc+P2g+P22P2L+P22=T21m \quad \text{Eq 6}$$

T21m is the measured arrival time of the signal through antenna 1 to MR2

Path 4 is the path from the emitter through antenna 2 to the input of MR2

$$R2+P21+P2L+P22P2g+Pc+P1g+P12P1L+P12+P1g+Pc=T22m \quad \text{Eq 7}$$

T22m is the measured arrival time of the signal through antenna 2 to MR2

$$Now\ TDOA*c=R1=R2. \quad \text{Eq 8}$$

Solving equation 4 and 5 for R1 and R2 respectively and substituting into equation 8 gives:

$$TDOA*c=T11m-T12m-Pc+(P21-P11)+(P12P22)-P2g \quad \text{Eq 9}$$

Solving equation 6 and 7 for R1 and R2 respectively and substituting into equation 8 gives:

$$TDOA*c=T21m-T22m+Pc+(P21-P11)+(P12-P22)+P1g \quad \text{Eq 10}$$

Now equating equations 9 and 10 and solving for Pc gives:

$$Pc=0.5*[(T11m-T12m)-(T21m-T22m)+P1g+P2g] \quad \text{Eq 11}$$

Pc is the path length between input port 1 of MR1 and input port 2 of MR2 and is one parameter needed to determine TDOA. Pc cannot be pre-calibrated since it varies with aircraft position. (T11m−T12m) is a TDOA measurement made on aircraft #1. Note that T11m and T12m did not have to be measured separately. Only TDOA1=(T11m−T12m) needed to be measured. Likewise only TDOA2 =(T21m−T22m) needed to be measured. The terms P1g and P2g refer to the gap between the two inputs of MR1 and MR2, respectively. They are very small and can be calibrated in the factory so they are known values. Now that Pc has been determined by the measurements, TDOA*c can be determined from either equation 10 or 11 if the terms (P21−P11)+(P12−P22) are known. Again, these terms can be made small and calibrated in the factory. A thermocouple could also be added to these small rigid paths to compensate for length variations as a function of temperature.

Figure 6:
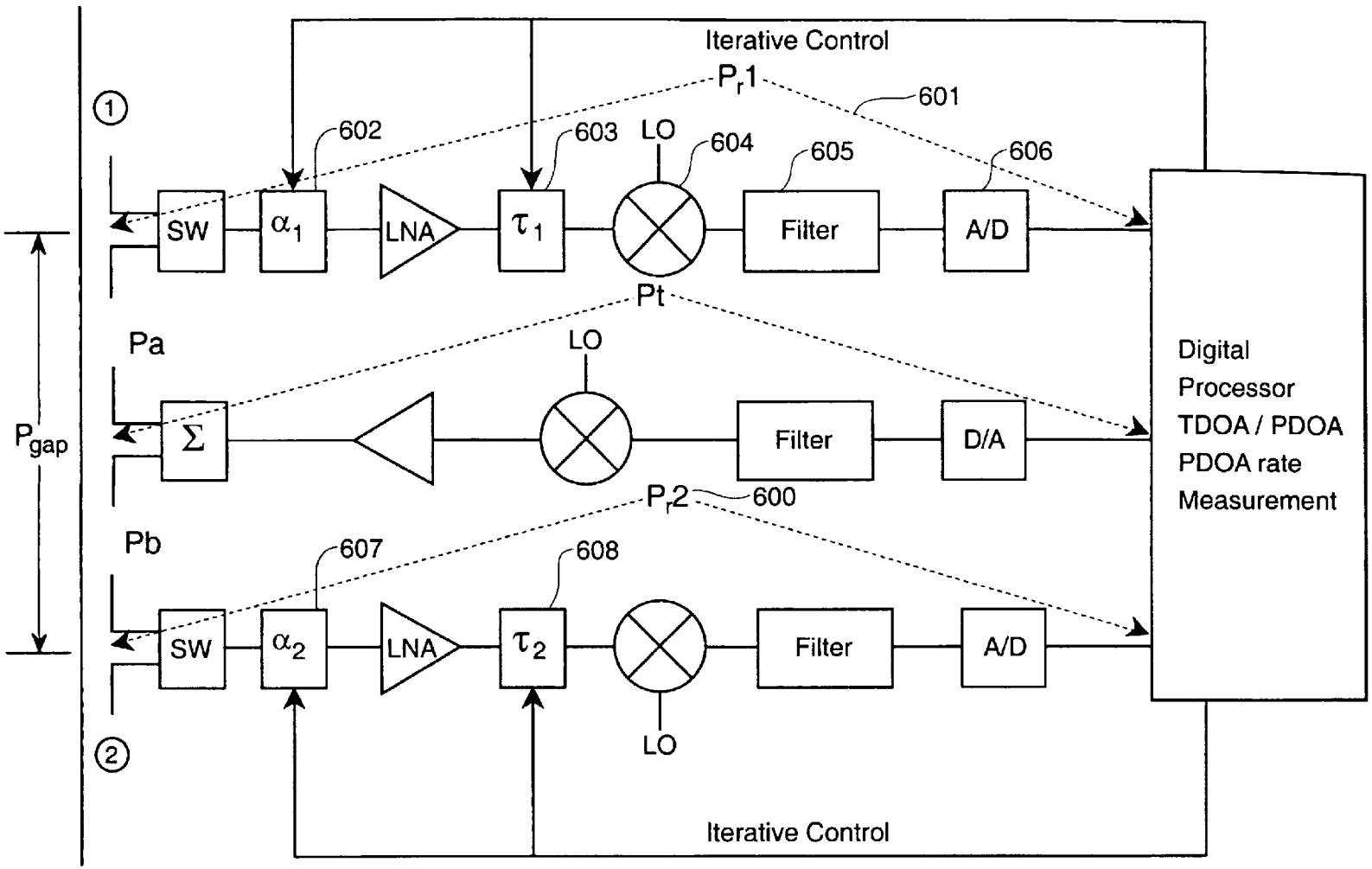
FIG. 6 shows a digital measurement receiver that is one approach for the RCVR1 and RCVR2 of FIG. 5.

FIG. 6 in the drawings is a digital measurement receiver. An analog measurement receiver could be used as well. An analog receiver could measure amplitude difference of arrival (ADOA) and phase difference of arrival (PDOA). The digital measurement receiver depicted in FIG. 6 will measure ADOA, PDOA, TDOA and PDOA rate. The measurement receiver depicted in FIG. 6 is one of the two receivers in FIG. 5 shown as RCVR 1 at 503 and RCVR 2 at 505. The local oscillator frequency (LO) in FIG. 6 is from the same source. The same sampling clock is also used for the two analog-to-digital (A/D) converters. The LO on each aircraft are similar but do not have to be the same. Likewise the sample clocks on the two aircraft are similar but do not have to be the same. The receiver in FIG. 6 is a receiver as depicted as 400 in FIG. 4 plus the addition of a variable delay line in each path. The basic receive function is that two radio frequency (RF) signals are received at ports 1 and 2 and converted to digital signals as they travel down paths Pr1 and Pr2 respectively. This part is typical of state of the art two channel digital receivers. One of these paths (Pr1 for example) is typical of state of the art single channel digital receivers. A single receive channel (input port 1 to the digital processor) works as follows. The switch (SW) is set to receive the signal from port 1. The attenuator ($\alpha_1$) is set to prevent the Low Noise Amplifier (LNA) from saturating. The variable delay ($\tau_1$) would not be in a typical receiver and will be explained later. The mixer 604 converts the signal from the high RF frequency to a low intermediate frequency (IF). The filter is to prevent frequencies other than the IF from passing. The IF is then converted to a digital signal by the analog-to-digital (A/D) converter. Most two channel digital receivers fabricate paths Pr1 and Pr2 to be equal. Some may also include calibration as shown in FIG. 6. Note that if path Pr1 at 601 and Pr2 at 600 are the same them the TDOA measured by the digital processor is the same as the TDOA at the input ports.

To calibrate paths Pr1 and Pr2 in FIG. 6, set $\alpha_1$ and $\alpha_2$ (at 602 and 607 respectively) and $\tau_1$ and $\tau_2$, (at 603 and 608 respectively) to zero. Then inject a signal down path Pt1. Since Pa and Pb are set equal at the factory, the measured TDOA through Pr1 and Pr2 should be zero. If it is not then the difference is used as the calibration correction factor. In equation form we can write:

$$S+Pt1+Pa+Pr1=Tm1 \quad \text{Eq 12}$$

$$S+Pt1+Pb+Pr2=Tm2 \quad \text{Eq 13}$$

Subtracting equation 12 from equation 13 gives $$Pr2-Pr1=(Tm2-Tm1)-(Pb-Pc) \quad \text{Eq 14}$$

Since Pb−Pa is known or zero then the measure values Tm1 and Tm2 determine the difference in Pr2 and Pr1. Therefore the measurement receiver self calibrates. The reason for the analog variable delays ($\tau_1$ and $\tau_2$ ) in the FIG. 6 TDOA receiver is to allow measurement accuracy greater than one clock cycle of the A/D clock. The digital processor can determine whether the signal arrived by measuring if it crossed a threshold. However this measurement is limited by the clock step. By varying the analog delay 603 or 608 such that the signal just crosses the threshold will allow a more precise result. It could be assumed that the pulse leading edge is linear and linear interpolation performed between the pulse amplitude samples just before and just after crossing a threshold. The two analog delays allow for an accurate result even if the pulse leading edge is not linear. Note that the two attenuators 602 and 607 need to also be adjusted so the received pulses average amplitudes are equal. Therefore they both cross a threshold at the same level below their amplitude. Another method that could be used to determine TDOA is cross correlation. Cross correlation is possible with this invention because both signals from the LBI antennas are available on both aircrafts receivers.

The invention discloses how to form a LBI from two separate aircraft. These two aircraft now form a two element LBI as depicted in FIG. 2. FIG. 2 shows the geometric relationships of a two aircraft-disposed large baseline interferometer system having receiver antennas located orthogonal to the aircraft velocity vectors. In the FIG. 2 drawing the emitter source is presumed located at the point 200 and each aircraft associated radio frequency measurement receivers are located at 202 and 204. The straight line paths between each interferometer antenna and the emission source at point 200 are indicated to have lengths R1 and R2.

FIG. 3 in the drawings shows a family of time and angle error curves relating to the FIG. 2 geometric relationships and their attending mathematical relationships. In FIG. 3, a measurement system with no errors may measure a time difference of arrival of 50 nanoseconds and a time difference of arrival rate of 217 picoseconds/second and thereby the emitter would be correctly located at a point 300 in the FIG. 3 drawing, (wherein from FIG. 2, R=50 kilometers and Θ=30 degrees). If instead, the measurement system incorrectly measured time difference of arrival as 49 nanoseconds, it would incorrectly place the emitter angle at line 302 in FIG. 3. Similarly, if the measurement system incorrectly measured time difference of arrival as 51 nanoseconds, it would incorrectly place the emitter at line 304 in FIG. 3. The angular wedge bounded by lines 302 and 304 in FIG. 3 therefore represents the location bound of a system with ±1 nanosecond measurement accuracy. Similarly the curved boundaries 306 and 308 represent the error boundaries for the measurement accuracies of ±10 picoseconds/second for the time difference of arrival rate. The rectilinear wedge defined by the intersection of lines 302 and 304 and the error contours 306 and 308 in FIG. 3 therefore show the possible location of the point 300. FIG. 3 is thus an example of results that may be obtained using the present invention.

Figure 7A:
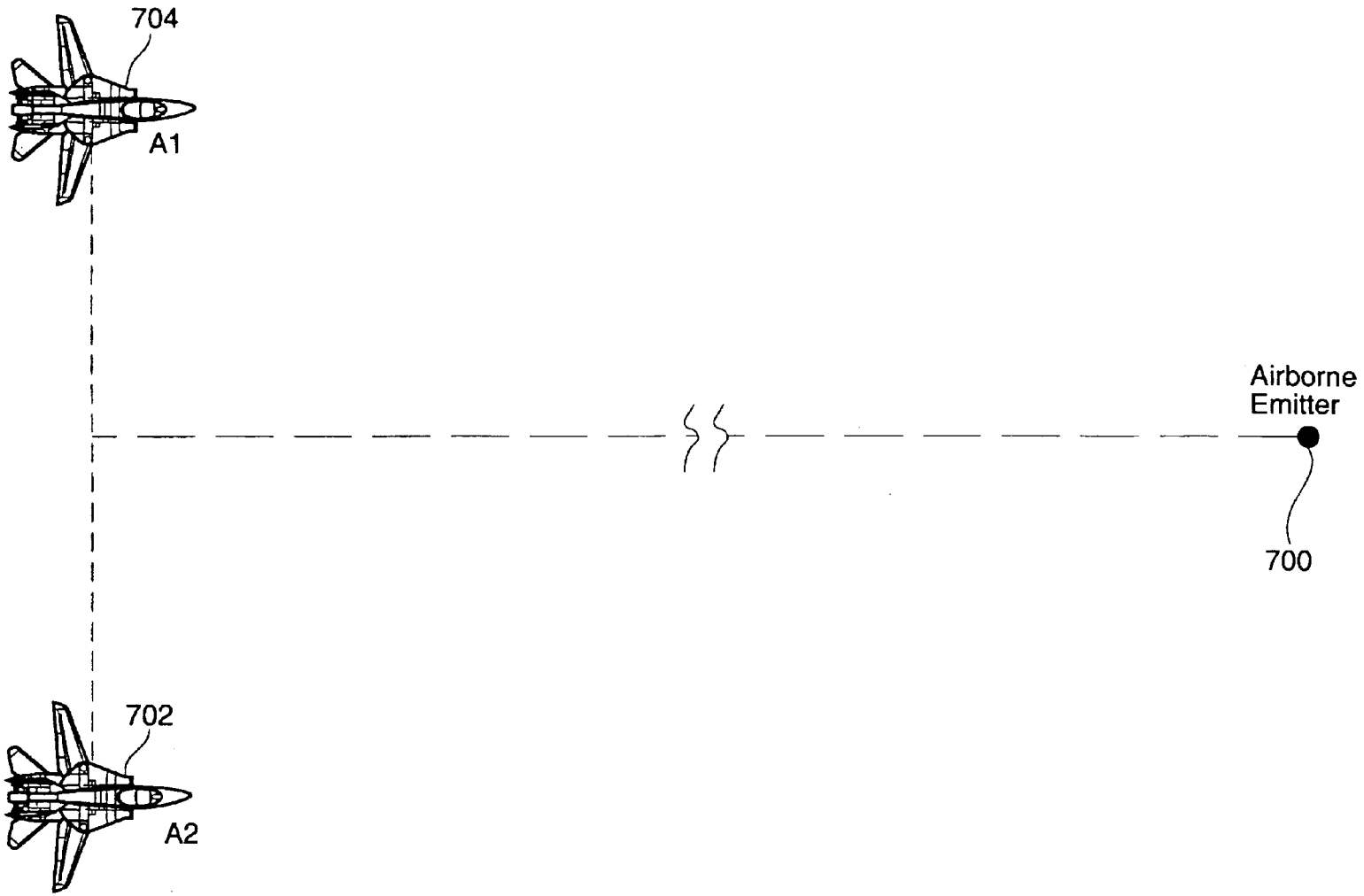
FIG. 7*a* shows a two-aircraft large baseline interferometer determining azimuth angle of an airborne emitter.
Figure 7B:
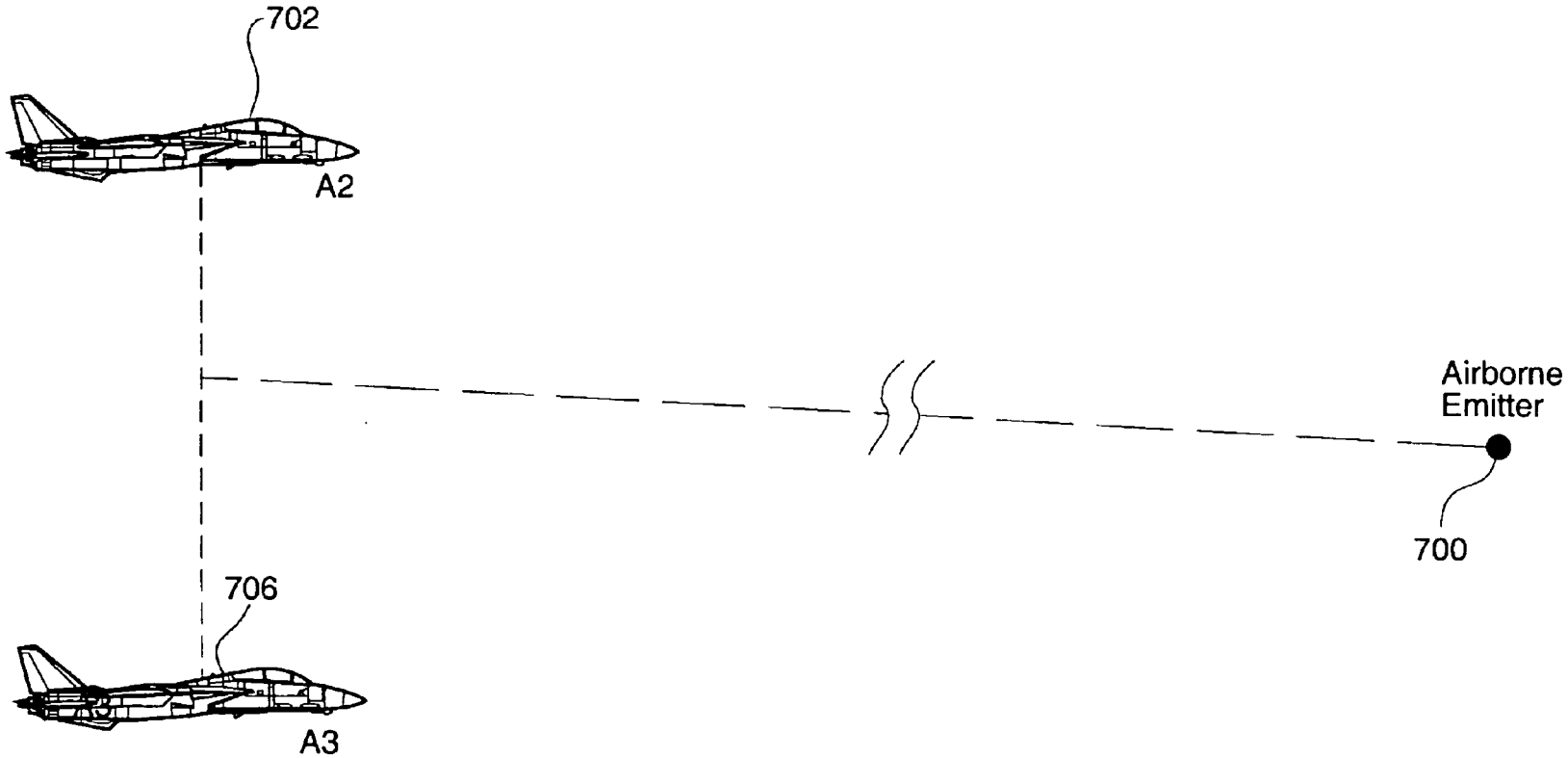
FIG. 7*b* shows a third aircraft, in addition to those of FIG. 7*a*, determining elevation of an airborne emitter.

The proceeding describes how a two element interferometer can be used to geo-locate a stationary emitter on the earth's surface. The TDOA gives the azimuth angle to the emitter. The intersection of this with the earth (aircraft altitude is known) then gives the emitter elevation. The TDOA rate or PDOA rate then determines range. When the emitter is airborne more than one LBI is required. For example as depicted in FIG. 7 three aircraft would be required to determine azimuth and elevation. In FIG. 7*a* aircraft 702 and 704 form a two aircraft LBI to determine the azimuth to the airborne emitter. To determine elevation a third aircraft depicted in FIG. 7*b* is needed to determine elevation. In FIG. 7*b* aircraft 702 and 706 form a vertical two element LBI to determine elevation. These three aircraft still have not determined range. Since the emitter is airborne, radar on any one of the three aircraft could be used to determine range. This, however, would not be a completely passive approach since one of the aircraft would have to radiate. For a completely passive approach a forth aircraft would be required to obtain a second azimuth line of bearing. Where these two azimuth line of bearings cross would then determine range. For even more accuracy two additional aircraft widely separated from the three aircraft in FIG. 7 could be used to provide a second line of bearing. As the two lines of bearing become more and more orthogonal then the range accuracy would increase. The basic invention of the patent is how to form a self-calibrating LBI from two aircraft. The application of one LBI as depicted in FIG. 1 and of multiple LBIs as depicted in FIG. 7 for emitter location are some examples of how this self-calibrating two aircraft LBI can be used.

The foregoing description of the preferred embodiment has been presented for purposes of illustration and description. It is not intended to be exhaustive or to limit the invention to the precise form disclosed. Obvious modification or variations are possible in light of the above teachings. The embodiment was chosen and described to provide the best illustration of the principles of the invention and its practical application to thereby enable on of ordinary skill in the art to utilize the invention in various embodiments and with various modifications as are suited to the particular scope of the invention as determined by the appended claims when interpreted in accordance with the breadth to which they are fairly, legally and equitably entitled.

What is claimed is:

1. A multiple configuration, self-calibrating baseline interferometer radio frequency emitter locating apparatus using two aircraft comprising the combination of:

a first search aircraft containing a first radio frequency measurement receiver, a first radio frequency antenna and a first variable delay component;

means for determining a path distance between said first radio frequency measurement receiver and said first radio frequency antenna;

a second aircraft containing a second radio frequency measurement receiver, a second radio frequency antenna and a second variable delay component;

means for determining a path distance between said second radio frequency measurement receiver and said second radio frequency antenna;

time difference of arrival, phase difference of arrival and phase difference of arrival rate processing apparatus disposed in each of said first and second radio frequency measurement receivers of said first and second aircraft; and selectively operable signal propagation time delay calibration apparatus connectable with signal propagating paths interconnecting said first and second aircraft;

wherein a signal received by said first radio frequency antenna and a signal received by said second radio frequency antenna are used by said processing apparatus to calculate time difference of arrival, phase difference of arrival, phase difference of arrival rate; and means for geo-locating said emitter by using down range and cross range time and angle error curves to straight-line graph time difference of arrival and phase difference of arrival whereby the time difference of arrival gives an azimuth angle to the emitter and the intersection with the aircraft altitude gives emitter elevation, the time difference of arrival rate and phase difference of arrival determines range and emitter location.

2. The multiple configuration, self-calibrating baseline interferometer radio frequency emitter locating apparatus of claim 1 wherein said first and second radio frequency measurement receivers comprise:

a plurality of analog-to-digital converters receiving signals using a sampling clock;

a frequency generating local oscillator, said frequency on said first and second aircraft being similar; and a sampling clock, said sampling clock on said first and second aircraft being similar.

3. The multiple configuration, self-calibrating baseline interferometer radio frequency emitter locating apparatus of claim 1 wherein said first and second variable delay component comprise a digital radio frequency memory.

4. The multiple configuration, self-calibrating baseline interferometer radio frequency emitter locating apparatus of claim 1 wherein said firsts and second variable delay components comprise a multiple port switch to switch between fixed delays such as multiple lengths of fiber optic lines.

5. The multiple configuration, self-calibrating baseline interferometer radio frequency emitter locating apparatus of claim 1 wherein said first and second radio frequency measurement receivers are digital receivers.

6. The multiple configuration, self-calibrating baseline interferometer radio frequency emitter locating apparatus of claim 1 wherein said firsts and second radio frequency measurement receivers are analog receivers measuring amplitude difference of arrival and phase difference of arrival.

7. The multiple configuration, self-calibrating baseline interferometer radio frequency emitter locating apparatus of claim 1 wherein said time difference of arrival, phase difference of arrival and phase difference of arrival rate processing apparatus disposed in each of said first and second radio frequency measurement receivers of said first and second aircraft further includes a thermal effects correctable thermocouple.

8. A multiple configuration, dual aircraft, self-calibrating baseline interferometer radio frequency emitter locating method comprising the steps of:

receiving a first radio frequency emitter signal through a first aircraft antenna and communicating said signal through a first aircraft variable delay line;

determining path distance between said first radio frequency measurement receiver and said first radio frequency antenna;

transmitting said first radio frequency emitter signal to a second aircraft measurement receiver and then back to a first aircraft measurement receiver;

determining path distance between said second radio frequency measurement receiver and said second radio frequency antenna;

receiving a second radio frequency emitter signal through a second aircraft antenna and then through said second aircraft variable delay line, said first and second aircraft variable delay lines preventing overlap between said first and second radio frequency emitter signals; and transmitting said second radio frequency emitter signal to said first aircraft measurement receiver and then back to said second aircraft measurement receiver;

said first and second aircraft measurement receiver measuring time difference of arrival, phase difference of arrival and phase difference of arrival rate and therefrom determining radio frequency emitter location; and geo-locating said emitter by using down range and cross range time and angle error curves to straight-line graph time difference of arrival and phase difference of arrival whereby the time differences of arrival gives an azimuth angle to the emitter and the intersection with the aircraft altitude gives emitter elevation, the time difference of arrival rate and phase difference of arrival determines range and emitter location.

9. The multiple configuration, dual aircraft, self-calibrating baseline interferometer radio frequency emitter locating method of claim 8 wherein steps of receiving first and second radio frequency emitter signals further comprise the steps of:

receiving signals through a plurality of analog-to-digital converters using a sampling clock;

generating a frequency using a local oscillator, said frequency on said first and second aircraft being similar; and sampling said frequency using a sampling clock, said sampling clock on said first and second aircraft being similar.

10. The multiple configuration, dual aircraft, self-calibrating baseline interferometer radio frequency emitter locating method of claim 8 wherein communicating said signal through a first and second aircraft variable delay line comprises a digital radio frequency memory.

11. The multiple configuration, dual aircraft, self-calibrating baseline interferometer radio frequency emitter locating method of claim 8 wherein said step of receiving a first radio frequency emitter signal further comprises the step of digitally receiving a first radio frequency emitter signal.

12. The multiple configuration, dual aircraft, self-calibrating baseline interferometer radio frequency emitter locating method of claim 8 wherein said step of receiving a second radio frequency emitter signal further comprises the step of digitally receiving a second radio frequency emitter signal.

13. The multiple configuration, dual aircraft, self-calibrating baseline interferometer radio frequency emitter locating method of claim 8 wherein said step of receiving a first radio frequency emitter signal further comprises communicating said signal through analog receivers measuring amplitude difference of arrival and phase difference of arrival.

14. The multiple configuration, dual aircraft, self-calibrating baseline interferometer radio frequency emitter locating method of claim 8 wherein said step of receiving a second radio frequency emitter signal further comprises communicating said signal through analog receivers measuring amplitude difference of arrival and phase difference of arrival.

15. The multiple configuration, dual aircraft, self-calibrating baseline interferometer radio frequency emitter locating method of claim 8 further comprising the step of correcting thermal effects relative to time difference of arrival, phase difference of arrival and phase difference of arrival rate using a thermocouple.

* * * * *